US006234192B1

(12) United States Patent
Esche et al.

(10) Patent No.: US 6,234,192 B1
(45) Date of Patent: *May 22, 2001

(54) FLUID VALVE

(75) Inventors: John C. Esche, Kohler; Erich D. Slothower; David J. O'Connell, both of Sheboygan, all of WI (US)

(73) Assignee: Kohler Co., Kohler, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/549,842

(22) Filed: Apr. 14, 2000

Related U.S. Application Data

(63) Continuation-in-part of application No. 09/291,393, filed on Apr. 14, 1999.

(51) Int. Cl.[7] .............................. B62H 5/14

(52) U.S. Cl. .............................. 137/355.25; 251/114; 251/240

(58) Field of Search .............................. 137/355.25, 355.23, 137/355.24; 251/114, 239, 240

(56) References Cited

U.S. PATENT DOCUMENTS

| | | | | |
|---|---|---|---|---|
| Re. 25,642 | | 9/1964 | Hagelthorn | 137/343 |
| 1,493,936 | * | 5/1924 | Hale | 137/355.25 |
| 1,516,226 | | 11/1924 | Wixom . | |
| 1,821,725 | | 9/1931 | Rinehart | 137/355.25 |
| 1,864,891 | * | 6/1932 | Coberly et al. | 137/355.25 |
| 1,928,178 | | 9/1933 | Holmgreen | 137/355.25 |
| 2,129,816 | | 9/1938 | Byars | 251/239 |
| 2,168,951 | | 8/1939 | Caldwell | 137/355.25 |
| 2,225,859 | | 12/1940 | Cox | 137/355.25 |
| 2,877,798 | | 3/1959 | Hansen | 251/114 |
| 2,969,923 | | 1/1961 | Fremion | 239/415 |
| 2,971,520 | | 2/1961 | Motis et al. | 134/172 |
| 2,991,945 | | 7/1961 | Rosenkranz | 239/459 |
| 3,185,172 | | 5/1965 | Hajek | 251/239 |
| 3,391,875 | * | 7/1968 | Hamrick | 135/355.23 |
| 3,498,546 | | 3/1970 | Logan et al. | 239/583 |
| 3,515,355 | | 6/1970 | Wagner | 239/526 |
| 3,915,382 | | 10/1975 | Davis | 239/195 |
| 4,023,387 | * | 5/1977 | Gould | 137/355.23 |
| 4,221,337 | | 9/1980 | Shames et al. | 239/428.5 |
| 4,221,338 | | 9/1980 | Shames et al. | 239/428.5 |
| 4,598,866 | | 7/1986 | Cammack et al. | 239/447 |
| 4,674,687 | | 6/1987 | Smith et al. | 239/447 |
| 4,962,888 | | 10/1990 | Beccaria et al. | 239/152 |
| 5,383,604 | | 1/1995 | Boesch | 239/447 |
| 5,390,695 | | 2/1995 | Howard | 137/355.27 |
| 5,574,424 | | 11/1996 | Fleischmann | 239/436 |
| 5,758,690 | | 6/1998 | Humpert et al. | 137/801 |
| 5,806,770 | | 9/1998 | Wang | 239/391 |

* cited by examiner

*Primary Examiner*—A. Michael Chambers
(74) *Attorney, Agent, or Firm*—Quarles & Brady LLP

(57) ABSTRACT

A three position valve suitable for use in a trigger nozzle assembly is disclosed which is suitable for use in kitchen utensil rinsing areas has a valve housing with a bore, a fluid inlet and a fluid outlet. A biased slidable member is positioned in the bore and provides for fluid flow between the fluid inlet and outlet when the valve is in a first position. High flow and stop flow positions are also provided upon compression of the trigger. The valve can be employed in conjunction with a combined spray and aerator head, as well as a hose take-up assembly.

10 Claims, 7 Drawing Sheets

FLUID VALVE

CROSS-REFERENCE TO RELATED APPLICATIONS

This application is a continuation-in-part of U.S. patent application Ser. No. 09/291,393, filed Apr. 14, 1999.

STATEMENT REGARDING FEDERALLY SPONSORED RESEARCH OR DEVELOPMENT

Not applicable.

BACKGROUND OF THE INVENTION

The present invention relates to fluid valves useful in conjunction with kitchen sinks. More particularly, it relates to valves of the foregoing type particularly useful in conjunction with kitchen faucets used with dish or kitchen utensil rinsing sinks and the like.

It is known in conjunction with commercial dish washing to provide a spray head for rinsing utensils prior to them being placed in an automated commercial dishwasher. In U.S. Pat. No. 2,971,520 there is shown a trigger nozzle 40 which is connected to a flexible conduit 36 which in turn is connected to a hose 32 with the hose being contained in a candy cane configured tube 30. See also, U.S. Pat. No. 2,969,923.

It is also known in the art to provide hose guide assemblies. One is shown in U.S. Pat. No. Re 25,642 which discloses a pulley 44 for a hose 66 with the pulley housed in a conduit 12. In U.S. Pat. Nos. 4,962,888 and 5,390,695 retractable hose reel assemblies are disclosed utilizing springs.

The prior art also teaches the use of combined spray and aerator faucets which can be selected by merely rotating the water discharge head. See generally, U.S. Pat. Nos. 4,221,338, 4,598,866 and 5,383,604.

The prior art does not, however, provide a valve which when in an "inactivated" position affords a low flow pattern, and with subsequent activation provides first a high flow rate and then upon further activation provides a stoppage of flow. This pattern is particularly desirable.

BRIEF SUMMARY OF THE INVENTION

In one aspect the invention provides a valve having a valve body with an axial bore, a fluid inlet and a fluid outlet. There is a chamber in the valve body which can be brought into fluid communication with the fluid inlet and outlet. A slidable member is positioned in the axial bore and the chamber, the slidable member having a fluid passage therein. A biasing means is constructed and arranged in conjunction with the slidable member to bias it towards a first outward position. When the slidable member is in the first outward position, a first low flow can be produced through the valve, when the slidable member is in a second partially outward position, a higher flow can be produced through the valve, and when the slidable member is in a third further inward position, flow through the valve is stopped.

In another aspect, the fluid passage of the slidable member is defined by an open ended spool, and there is a cap member connected to the valve body, the cap member having a cavity for receiving a portion of the slidable member.

In yet another aspect, a valve seat is provided adjacent a junction of the axial bore and chamber by a shoulder portion and a surface of a passage.

In still another aspect, the slidable member is moved by a trigger member connected to the valve body.

In a preferred embodiment, the fluid outlet is connected to a combined spray and aerator selector head.

In another preferred embodiment, the valve body includes a trigger assembly connected to a flexible hose and the flexible hose is connected to a hose take-up assembly, comprising a pulley having a groove and a housing for rotatably guiding the pulley. The hose is placed in a portion of the groove and the pulley is of sufficient weight to assist gravitationally in pulling the trigger assembly toward the end of a spout.

In an additional aspect, there is provided a three position biased valve including a valve body having an axial bore, an inlet and an outlet in communication with the bore. A biased flow regulating member is slidably positioned in the axial bore. The axial bore and the biased flow regulating member are constructed and arranged to provide a limited fluid flow between the inlet and the outlet when at a first position, at a second position a second flow rate is produced greater than the first flow rate, and at a third position flow is stopped. The first, second and third positions are correlated with the biasing of the flow regulating member so that at the first position the biasing is at a least amount, at the third position, it is at a most amount and at the second position, it is biased to an amount between the least and most amounts.

The objects of the invention therefore include:

a. providing a three position valve which allows for flow when in an inactivated position;

b. providing a three position valve of the foregoing type for use with a spray and aeration function;

c. providing a valve of the foregoing type which is housed in a trigger nozzle;

d. providing a valve of the foregoing type which is connected to a flexible hose having a take up feature;

e. providing a valve of the foregoing type wherein the flow of water is conveniently terminated.

These and still other objects and advantages of the invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF THE INVENTION

Figure 1:
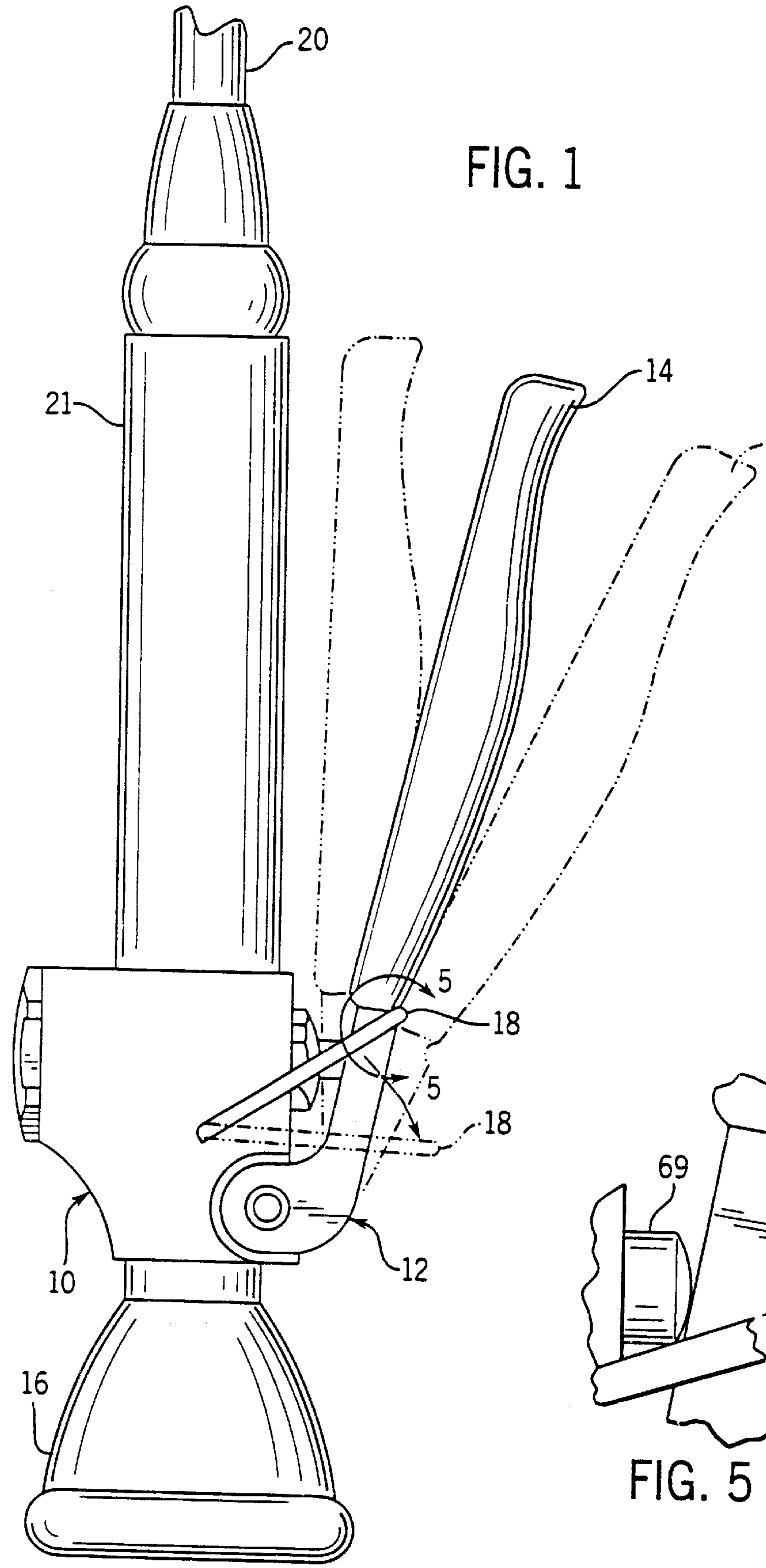
FIG. 1 is a perspective view of a trigger nozzle assembly employing the valve of the present invention.

Referring to FIGS. 1–3 and 6A, the main valve, generally 10, of this invention is shown in conjunction with a trigger nozzle assembly 12 and a spray/aerator head 16. The trigger nozzle assembly 12 has a trigger handle 14 and a loop 18 to hold the handle in an intermediate position as desired by the user.

The trigger nozzle assembly 12 is connected to a hose 20 by means of grip tube 21. Hose 20 is slidably contained in a J-spout 22, that in turn is connected to a swivel bearing 24. Hose 20 is connected at the end opposite the trigger nozzle assembly to a mixing faucet 26. The mixing faucet 26 and the swivel 24 are suitably mounted on a counter 28 adjacent to a sink 30.

Figure 4A:
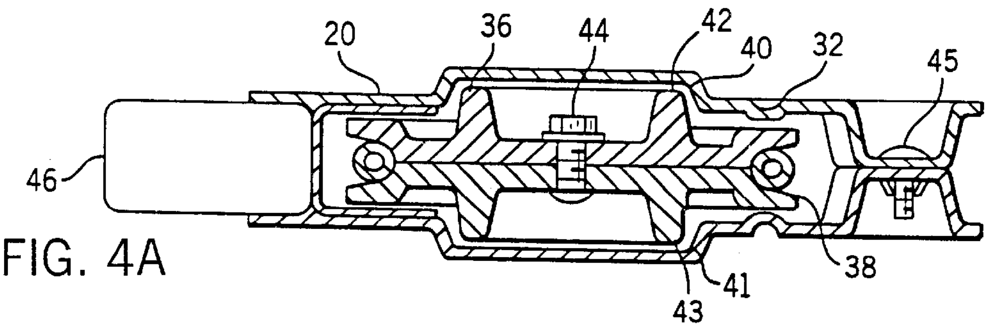
FIG. 4A is a sectional view taken along line 4—4 of FIG. 3.

Positioned under the sink 28 is a hose take-up assembly, generally 31, having the housing 32 supported in part by the support 34 and the flange 35. As seen in FIG. 4A, positioned inside the take-up housing 32 is a pulley 36 having a groove 38 which accommodates a portion of hose 20. Housing 32 also includes enlarged cavity portions 40 and 41 to accommodate the flanges 42 and 43 of the pulley 36 to serve as a guide. The pulley is preferably composed of two sections which are mounted together by the nut and bolt 44. The pulley in this instance is of sufficient weight that it will effect a downward gravitational force on the hose 20 and thus assist in its retracting from the position shown in FIG. 3 to that in FIG. 2. The pulley housing 32 is also constructed in two sections as is the pulley with the sections being joined by the nut and bolt 45. The opposing end of the housing 32 is connected to a support 46.

Figure 6B:
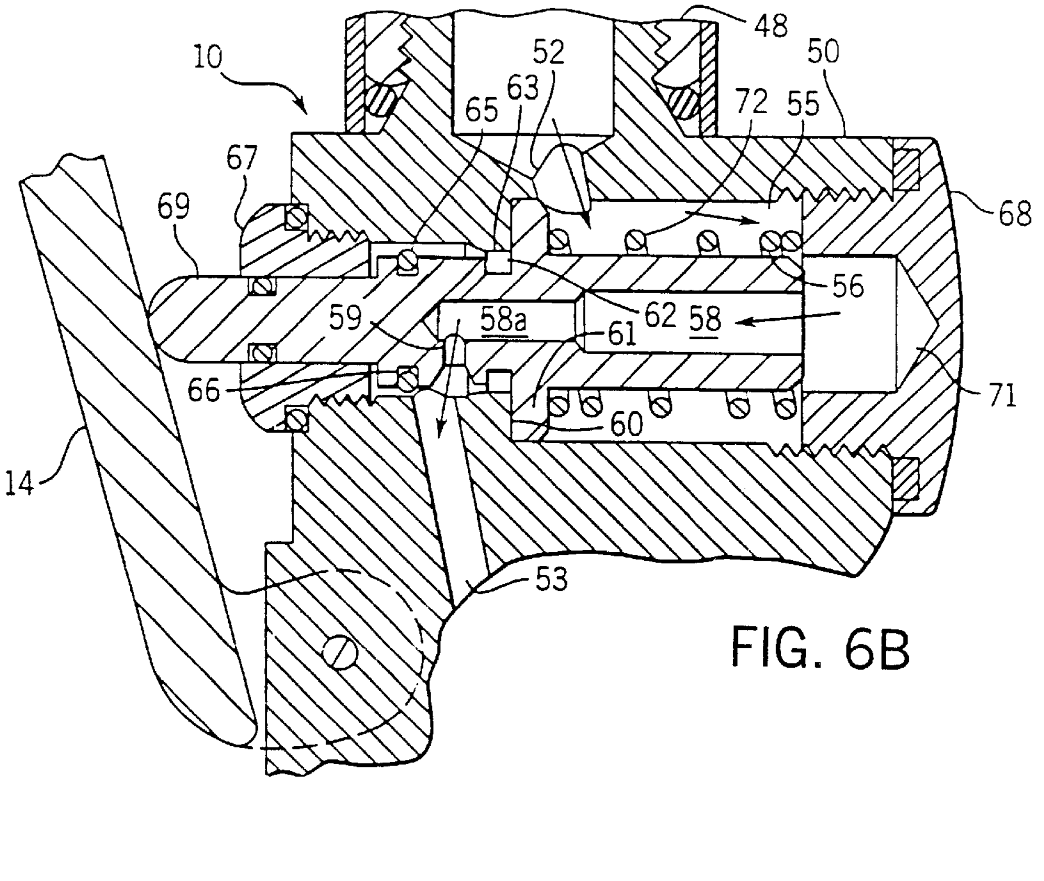
FIG. 6B is a section view of the valve similar to FIG. 6A, however, with the slidable member having only one radial port.
Figure 6A:
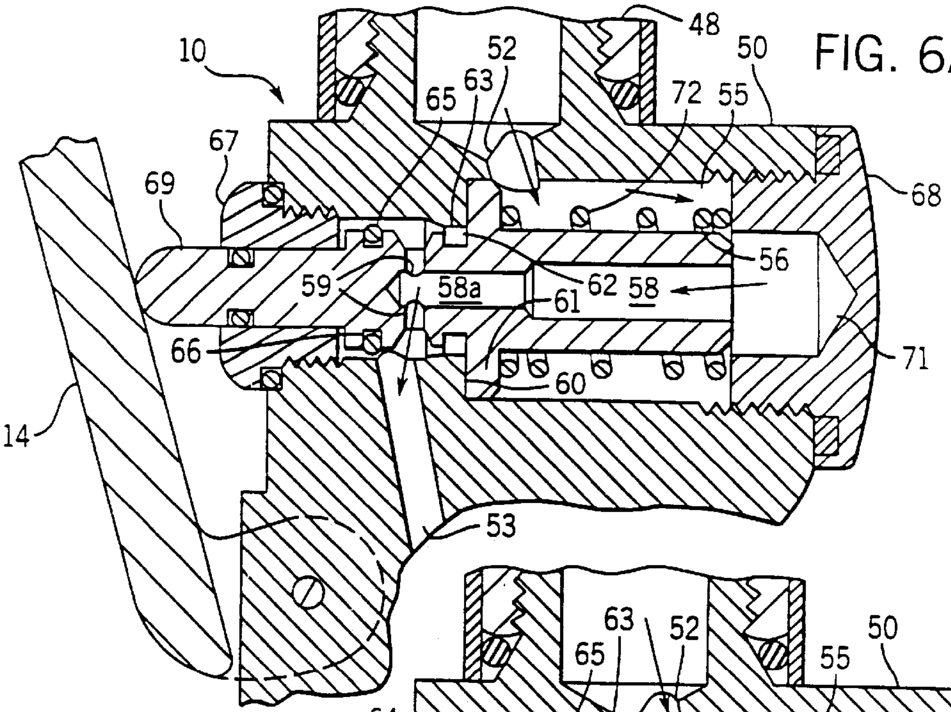
FIG. 6A is a sectional view of the valve with the handle in its rest position.
Figure 7:
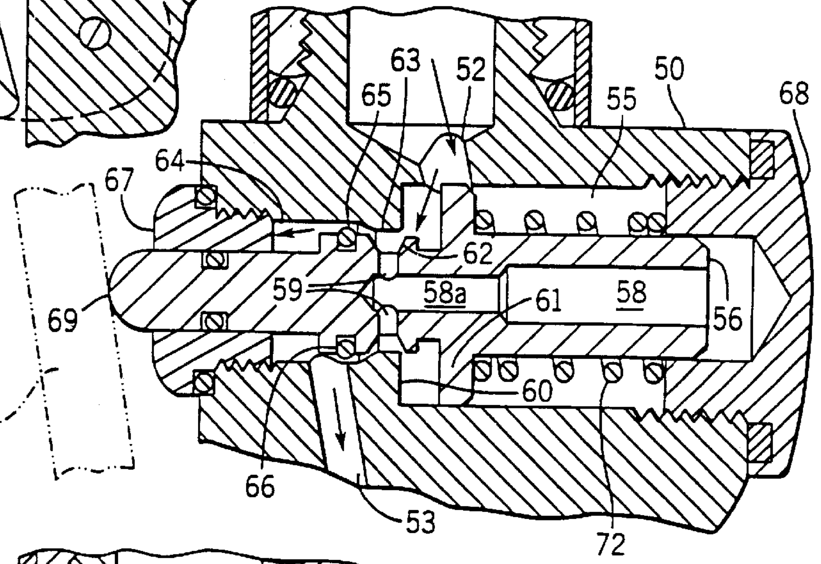
FIG. 7 is a view similar to FIG. 6A, albeit showing how the valve appears when the handle is in an intermediate position.
Figure 8:
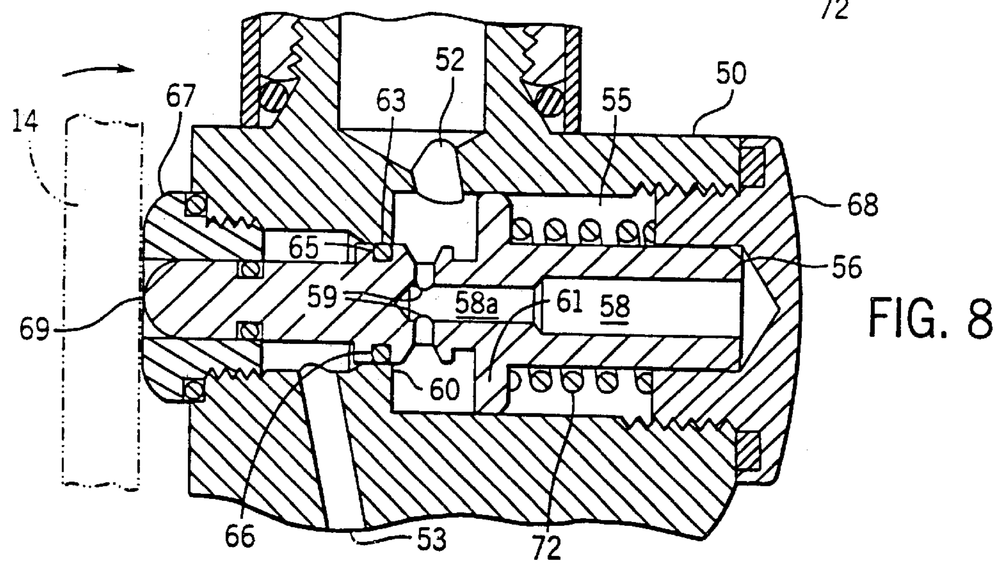
FIG. 8 is a view similar to FIG. 6A, albeit showing how the valve appears when the handle is in a full inward position.

Referring to FIGS. 6A, 7 and 8, there is shown in detail the main valve 10. It includes a valve body 50 with an inlet 52 and an outlet 53. There is also a chamber 55 which accommodates a slidable member 56 including an open ended spool. The slidable member 56 has axial passages 58 and 58*a,* as well as radial outlet ports 59. A shoulder 60 is disposed in the valve body 50 for contact with flange 61 of the slidable member 56. There is also the passage surface 63 which serves as a valve seat in combination with shoulder 60.

A sealing member 65 is positioned in a groove 66 for sealing with passage surface 63. There are also end caps 67 and 68 which are threadably connected to opposing ends of the valve body 50. A head portion 69 which also forms a part of the slidable member 56 extends through the end cap 67, whereas the end cap 68 has a cavity 71 for accommodating a portion of the slidable member 56 when it is in the position shown in FIGS. 7 and 8. A spring 72 is positioned between the end cap 68 and the flange 61 for biasing the slidable member 56 in the direction of trigger handle 14.

In FIG. 6A the valve 10 is in a first position with respect to the handle 14. In this position the spring 72 forces handle 14 via plunger 69. As will be seen from the flow arrows in FIG. 6A, water is able to enter through the inlet 52, pass around the slidable member 56 and into the cavity 71. From there it will pass through the axial passages 58 and 58*a,* out the radial outlet ports 59 and into the outlet 53. Accordingly, at any time the mixing valve 26 is in an open position, water will flow from hose 20 and through valve 10. The utilization of a valve 10 that is open when it is not compressed allows its use in conjunction with a pull-out spray assembly without having to employ a separate pressurized vacuum breaker.

Figure 5:
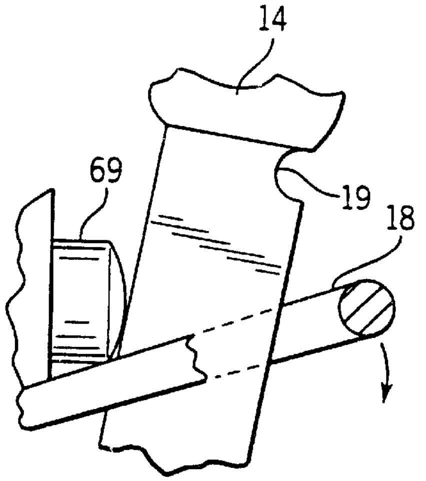
FIG. 5 is a partial view taken along line 5—5 of FIG. 1.
Figure 2:
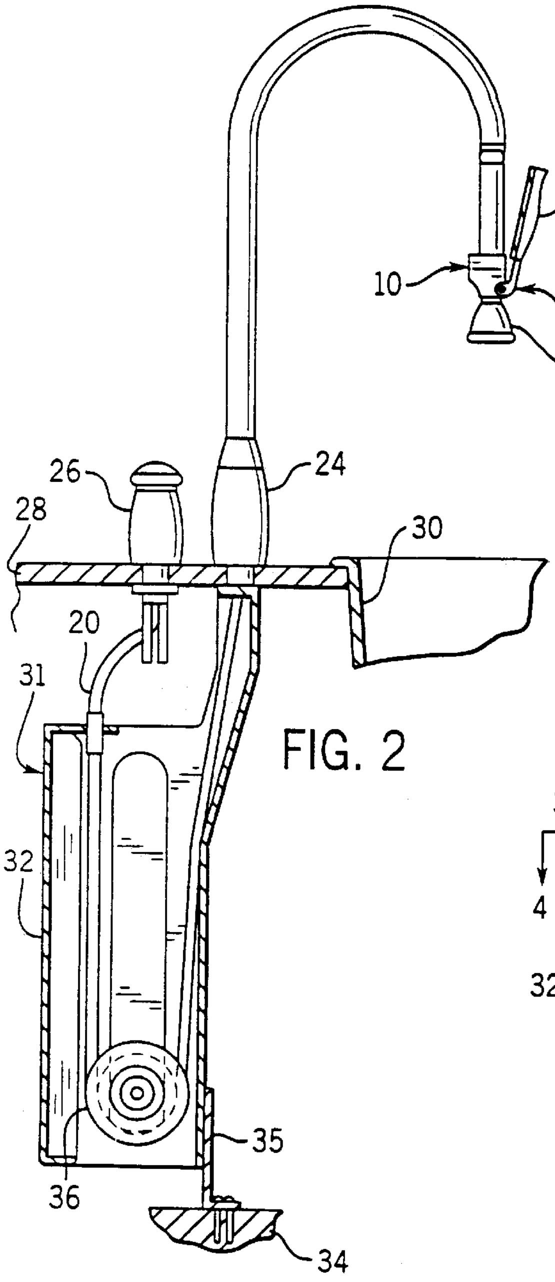
FIG. 2 is a view in side elevation showing the spray nozzle of FIG. 1 in conjunction with a hose take up feature.
Figure 3:
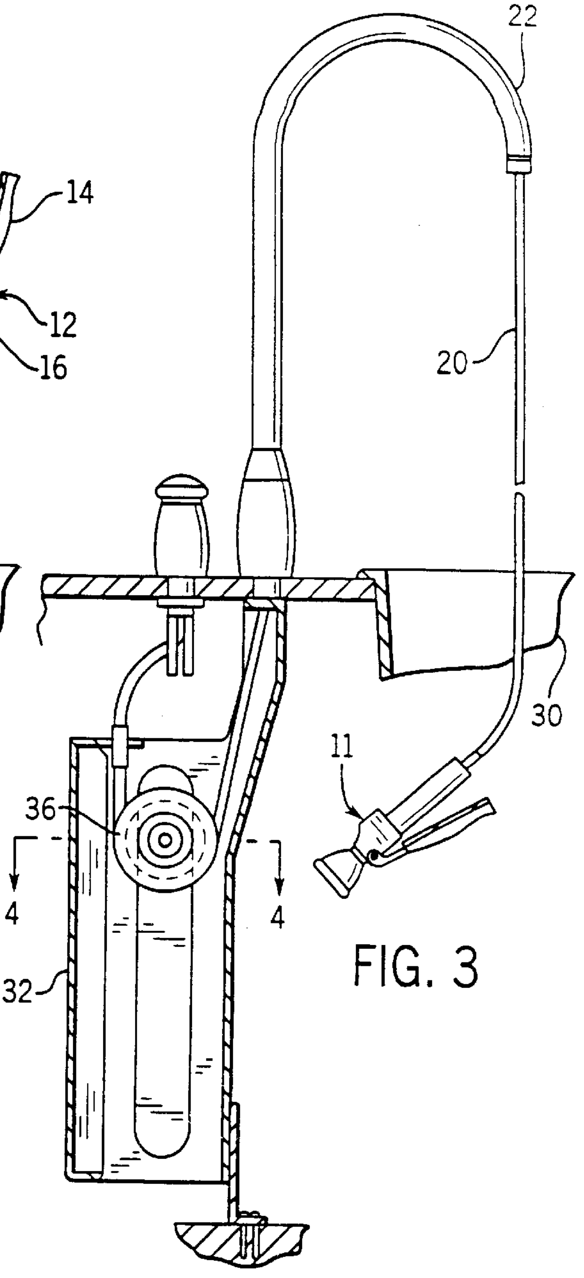
FIG. 3 is a view similar to FIG. 2 showing the hose take up in another position.

Referring next to FIG. 7, the pivoting of the handle 14 toward the valve body 50, and accordingly the slidable member 56 to a position farther into chamber 55, moves the flange 61 away from the shoulder 60 and allows water to flow directly from the inlet 52 through the passage 62 and into the cavity 64. From there it will flow out through outlet 53. This effects a higher flow rate through the valve 10 with the spring 72 in a more compressed state. When handle 14 is in this position, the loop 18 can be placed in notch 19 of trigger handle 14. This is seen in conjunction with FIGS. 1 and 5.

Referring next to FIG. 8, as the handle 14 is pivoted more in the direction of the valve body 50, this will move the slidable member to its most inward position. There it is seen that the sealing member 65 seals against the passage surface 63 which forms a valve seat and thereby closes all flow to the outlet 53. This latter off position is when the handle 14 is in its most inward position with respect to the valve body 50, and allows the operator to conveniently move the trigger nozzle assembly to various positions such as filling a pot with water on a counter top without spraying water in an undesired place.

Referring now to FIGS. 9–14, there is shown the combined spray/aerator head 16. The head 16 has a waterway member 74 threadably connected to the valve body 50, a face member 81 downstream and adjacent the waterway member 74 has a spray mode water path and an aerator mode water path to provide a desired head exit water stream, and a shell 77 enclosing the waterway member 74 and face member 81. Water exiting the valve outlet 53 passes through the waterway member 74 and one of the water paths in the face member 81. Rotating the face member 81 changes the flow of water from one water path to the other.

Looking at FIGS. 10, 11, 13, and 14, the waterway member, generally 74, threadably engages the valve body 50 to attach the head 16 to the valve 10, and supports the shell 77. An oval bore 78 formed in the waterway member body 75 communicatively connects the valve outlet 53 to a chamber formed between the waterway member 74 and face member 81. A disc 79 formed at one end of the body 75 has a downwardly facing cavity 76 which cooperates with the face member 81 to form the chamber. The disc 79 also has an upper surface 80 which supports the shell 77. Preferably, a washer 99 interposed between the disc upper surface 80 and shell 77 allows rotation of the shell 77 with respect to the waterway member 74 when changing modes. Most preferably, the valve body 50 extends into the shell 77 to contact the disc upper surface 80 and provide a stop when tightened to the waterway member 74 on the valve body 50.

Figure 9:
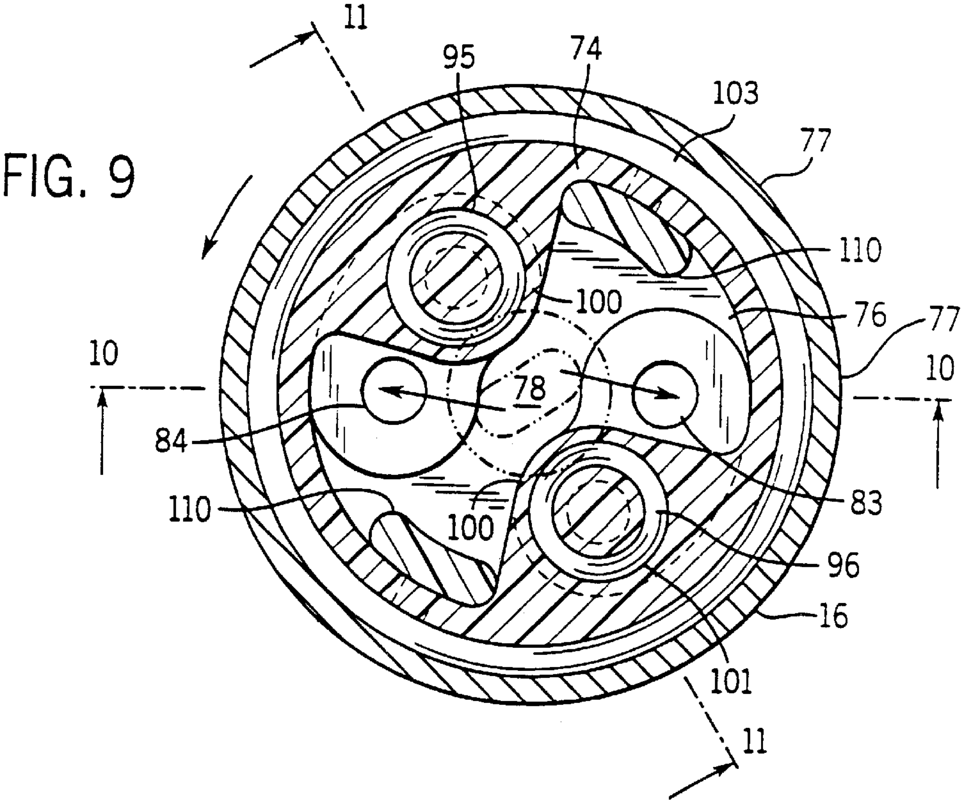
FIG. 9 is a sectional view taken along line 9—9 of FIG. 10 when a spray function is provided.
Figure 12:
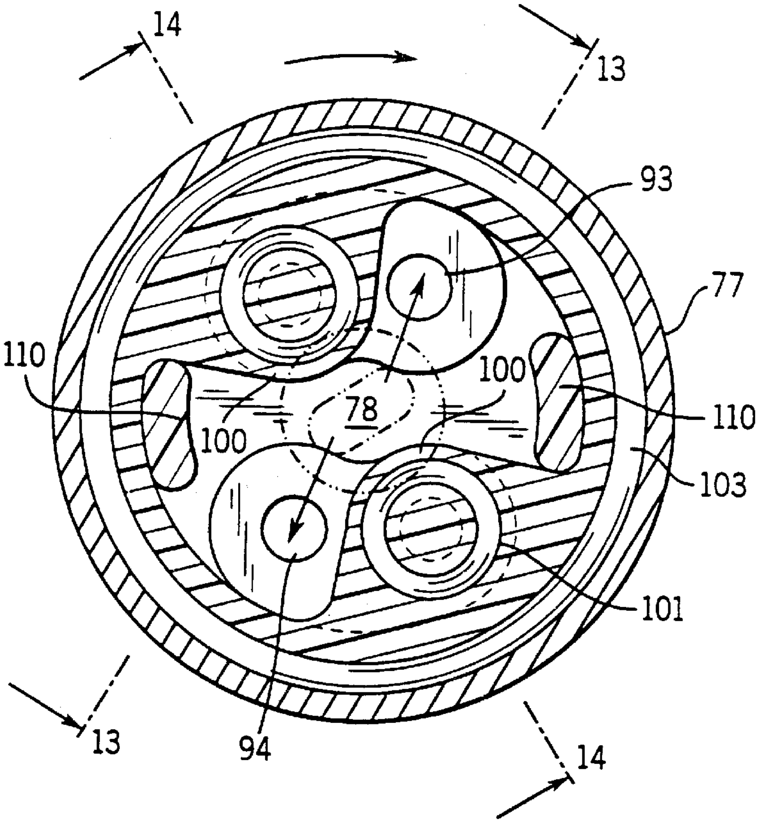
FIG. 12 is a view similar to FIG. 9, albeit illustrating parts rotated to provide an aerating function.

Referring to FIGS. 9 and 12, opposing wings 100 extending from the cavity wall cover selected ports 83, 84 or 93, 94 formed in the face member 81 to block water from flowing through one of the water paths in the face member 81. Seals 95, 96 retained in seal grooves 101 formed in the wings 100 abut the face member 81 and seal the selected ports 83, 84 or 93, 94 to prevent water from flowing therein.

Referring back to FIGS. 10, 11, 13, and 14, the face member 81 has an inlet end 104 which cooperates with the waterway member cavity 76 to form the chamber, and a downwardly facing outlet end 105. Exterior threads 106 formed on the edge of the face member 81 proximal the inlet end 104 threadably engage the shell 77 to rigidly mounting the face member 81 in the shell 77. A stepped groove 107 formed in the face member edge interposed between the inlet and outlet ends 104, 105 cooperates with the shell 77 to form an annular spray chamber 87. Gasket grooves 108 formed in the face member edge above and below the stepped groove 107 receive gaskets 109 which abut the shell 77 to inhibit water from passing between the face member 81 and shell 77. A gasket groove 102 formed in the disc edge receives a gasket 103 to allow movement of the shell 77 with respect to the waterway member 74 while inhibiting water from passing between the shell 77 and waterway member 74.

Water passing through the face member water paths enters the path through the face member inlet end 104 and exits through the face member outlet end 105. The face member inlet end 104 is substantially flat with a pair of spray ports 83, 84 and a pair of aerator ports 93, 94 formed therein, and cooperates with the waterway member cavity 76 to form the chamber. Preferably, a pair of tabs 110 formed on the face member inlet end 104 extend into the cavity 76, and when engaging the wings 100 ensure the seals 95, 96 are aligned over one pair of the ports 83, 84 or 93, 94. The face member outlet end 105 has a downwardly facing aerator cavity 90 surrounded by a spray rim 88.

Figure 10:
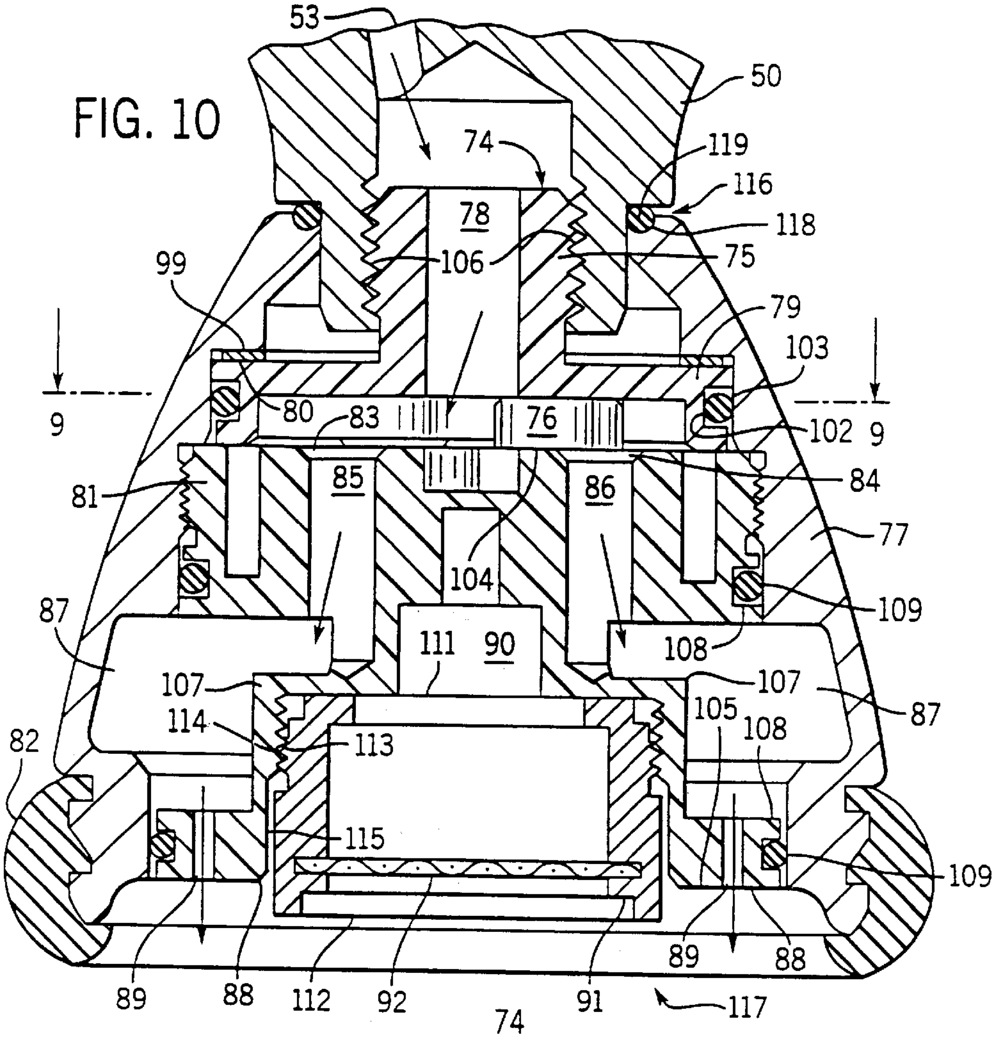
FIG. 10 is a sectional view taken along line 10—10 of FIG. 9.
Figure 13:
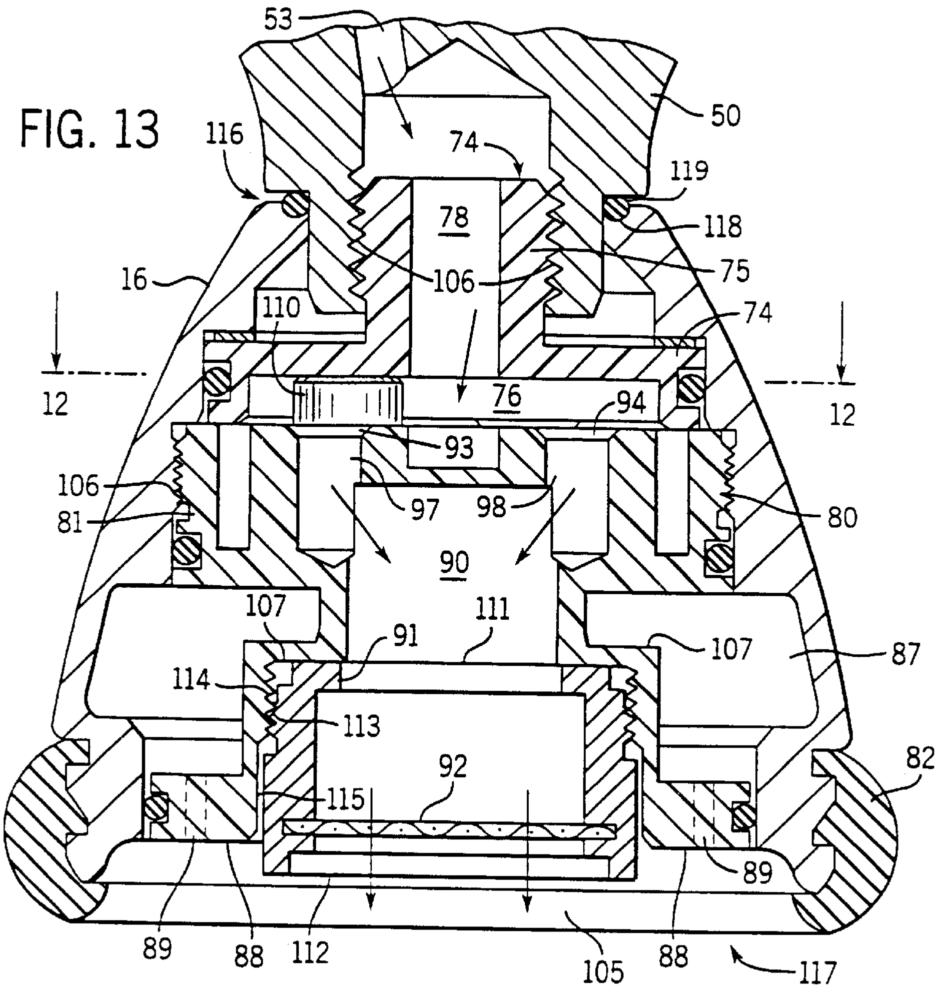
FIG. 13 is a sectional view taken along line 13—13 of FIG. 12.
Figure 14:
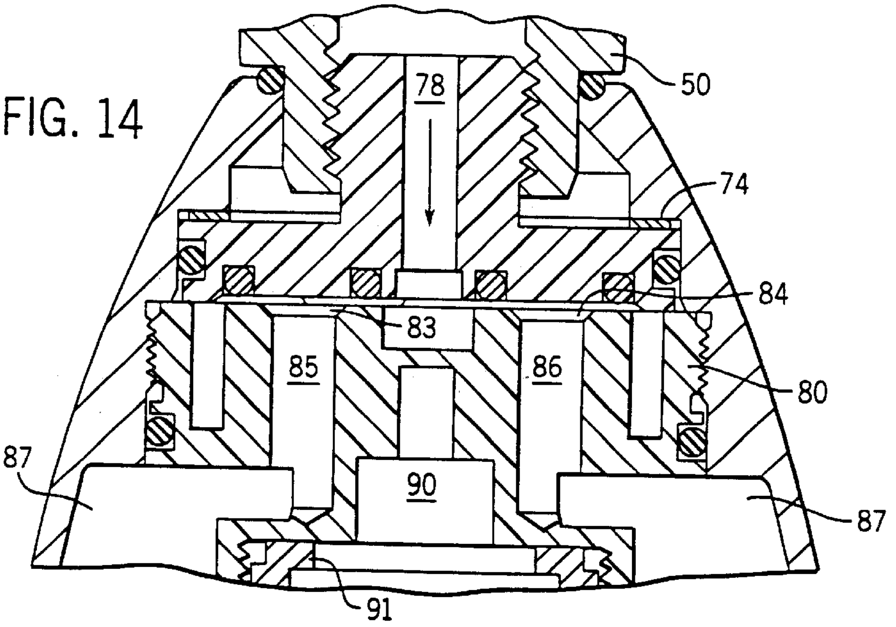
FIG. 14 is a sectional view taken along line 14—14 of FIG. 12.

The face member 81 has an aerator mode water path which directs water through an aerator 91 in the aerator mode, and a spray mode water path which directs water through spray nozzles 89 in the spray mode. The spray mode water path, shown best in FIG. 10, is defined by spray passageways 85, 86 extending from the spray ports 83, 84 which communicatively connect the spray ports 83, 84 to the spray chamber 87. Water in the spray chamber 87 is exhausted through a plurality of the spray nozzles 89 formed in the spray rim 87 to provide the desired water exit stream. The aerator mode water path, shown best in FIG. 13, is defined by aerator passageways 97, 98 extending from the aerator ports 94, 95 which communicatively connect the ports 94, 95 to the aerator cavity 90. Water in the aerator cavity 90 exits the head 16 through the aerator 91.

The tubular aerator 91 has an inlet 111, an outlet 112, and external threads 113 which engage internal threads 114 formed in the aerator cavity wall 115. An aerator device 92 mounted proximal the outlet 112 aerates the water passing therethrough.

The bell shaped shell 77 encloses the waterway member 74 and face member 81, and has an open top 116 and open bottom 117. A boot 82 surrounding the shell bottom 117 provides a grip for rotating the shell 77, and thus the face member 81 mounted therein, to change the water path between the aerator mode and the spray mode. A step 118 formed in the shell top 116 receives a gasket 119 to prevent debris from entering between the shell 77 and valve body 51.

Figure 11:
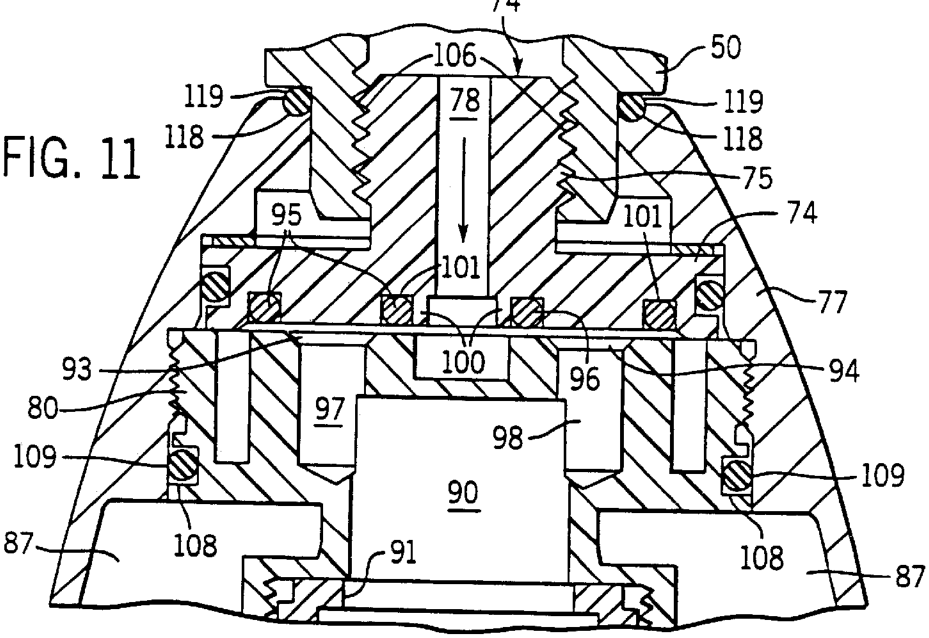
FIG. 11 is a sectional view taken along line 11—11 of FIG. 9.

In the spray mode, shown in FIGS. 9–11, the waterway member seals 95, 96 block the aerator ports 93, 94, and water in the waterway member cavity 76 enters the spray ports to follow the spray mode water path through the face member 81, and out of the head 16 through spray nozzles 89. Conversely, in the aerator mode, shown in FIGS. 12–14, the waterway member seals 95, 96 block the spray ports 83, 83, and water in the waterway member cavity 76 enters the aerator ports 93, 94 to follow the aerator mode water path through the face member 81, and out of the head 16 through the aerator 91. Rotating the face member 81 positions the desired ports 83, 84 or 93, 94 beneath the seals 95, 96 to seal off the undesired water path.

Figure 4B:
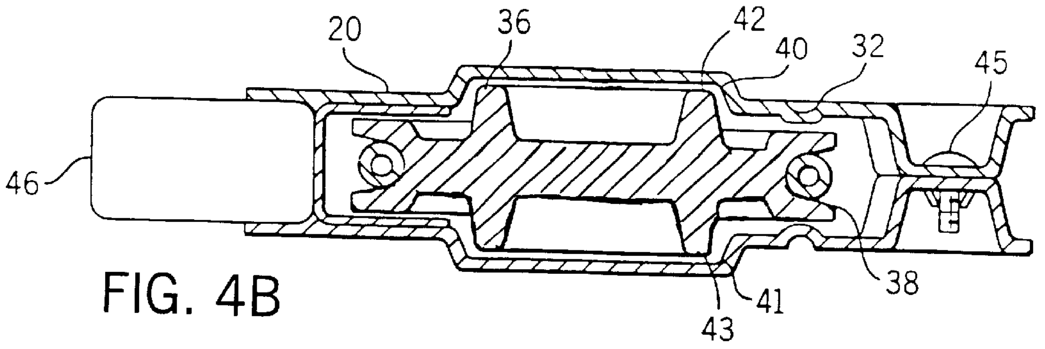
FIG. 4B is a section view similar to FIG. 4A, however, with a one-piece pulley.

The above is considered to be the preferred embodiment of the invention. However, those skilled in the art will appreciate that various changes and modifications can be made without departing from the scope of the invention. For example, while the valve has been shown in conjunction with a hose take-up assembly and a spray and aerator head, the valve can be used without the hose take-up and a spray/aerator function. Neither is it necessary to employ a trigger valve with a loop. Also, as shown in FIG. 4B, the pulley 36 can be of a one-piece construction so that no fasteners are needed. Moreover, as shown in FIG. 6B, the slidable member 56 of the main valve 10 can include only one radial outlet port 59.

All such and other modifications within the spirit of the invention are meant to be within its scope as defined by the appended claims.

We claim:

1. A valve, comprising:

a valve body connected to a spout and having an axial bore, a fluid inlet and a fluid outlet;

wherein the valve body is linked to a trigger assembly and connected to a flexible hose which in turn is connected to a hose take-up assembly, the hose take up assembly comprising a one-piece pulley having a groove and a housing for rotatably guiding the pulley, the hose being placed in a portion of the groove and the pulley being of sufficient weight to assist gravitationally in pulling the trigger assembly towards an end of the spout;

a chamber in the valve body which can be brought into fluid communication with the fluid inlet and outlet;

a slidable member positioned in the axial bore and the chamber, the slidable member having a fluid passage therein;

biasing means constructed and arranged in conjunction with the slidable member to bias the slidable member towards a first outward position, the slidable member being held at the first outward position by the biasing means in the absence of the opposing force;

wherein when the slidable member is in the first outward position, a first low flow can be produced through the valve, when the slidable member is in a second partially outward position a higher flow can be produced through the valve and when the slidable member is in a third, further inward position flow through the valve is stopped.

2. The valve as defined in claim 1, wherein the fluid passage of the slidable member is defined by an open ended spool.

3. The valve as defined in claim 1, further including a cap member connected to the valve body, the cap member having a cavity for receiving a portion of the slidable member.

4. The valve as defined in claim 1, wherein a valve seat is provided adjacent a junction of the axial bore and chamber by a shoulder portion and a surface of a passage.

5. The valve as defined in claim 1, wherein the biasing means is a spring.

6. The valve as defined in claim 1, wherein the fluid outlet is connected to a combined spray and aerator selector head.

7. The valve as defined in claim 6, wherein the combined spray and aerator selector head includes a rotatable disk having two pairs of ports positioned opposite each other.

8. The valve as defined in claim 1, wherein the hose take-up housing has an enlarged cavity and the pulley includes flange portions for sliding therein.

9. The valve as defined in claim 1, wherein the fluid inlet is connected to a fluid conduit, fluid traveling through which is being controlled by a mixing valve.

10. The valve as defined by claim 1, wherein the slidable member includes a single radial outlet port intersecting the axial bore.

* * * * *